Feb. 18, 1958     C. M. MOORE     2,823,826
INTERLOCKING PANELS AND JOINT
Filed April 12, 1955     7 Sheets-Sheet 1

INVENTOR
Clyde Maurice Moore
BY Bacon & Thomas
ATTORNEYS

Feb. 18, 1958
C. M. MOORE
2,823,826
INTERLOCKING PANELS AND JOINT
Filed April 12, 1955
7 Sheets-Sheet 2
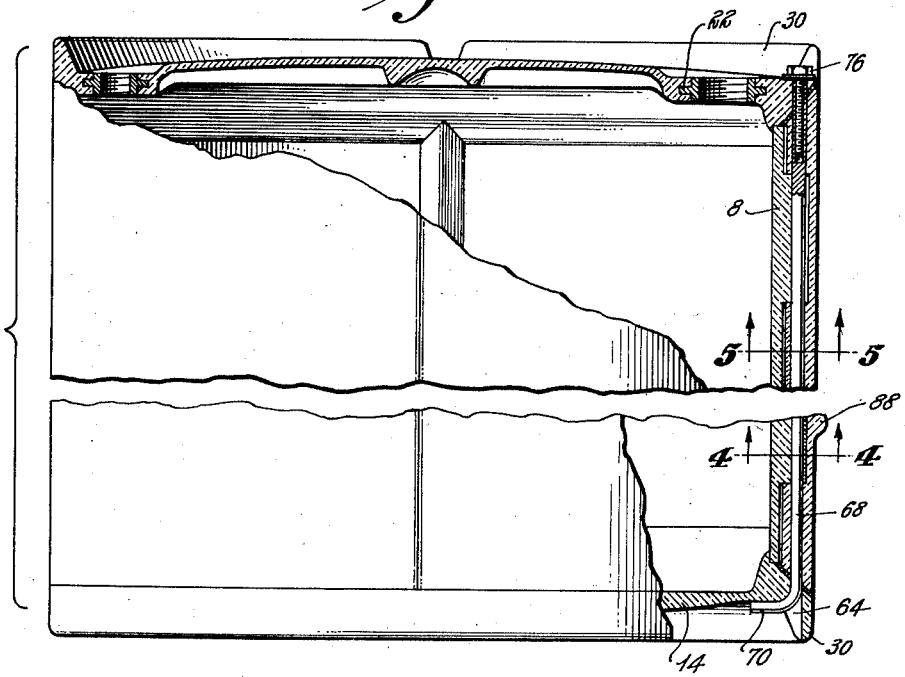
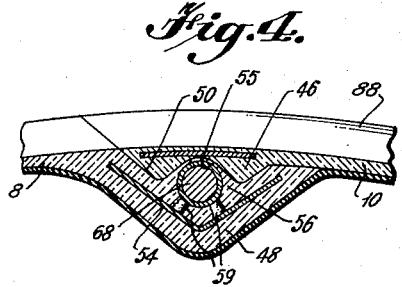
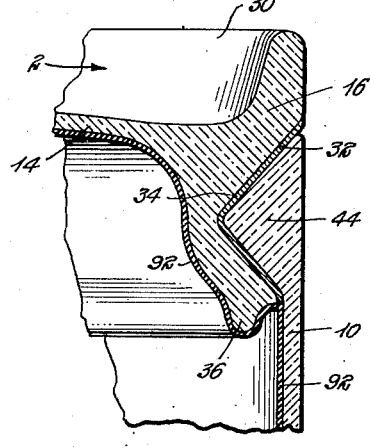
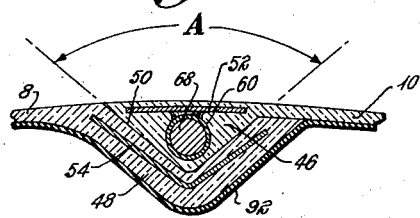
INVENTOR
Clyde Maurice Moore
BY
Bacon & Thomas
ATTORNEYS Feb. 18, 1958
C. M. MOORE
2,823,826
INTERLOCKING PANELS AND JOINT
Filed April 12, 1955
7 Sheets-Sheet 3
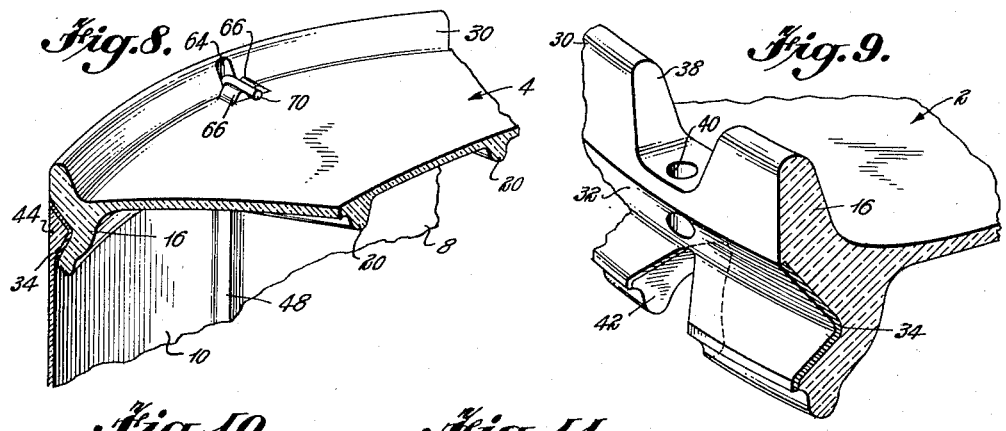
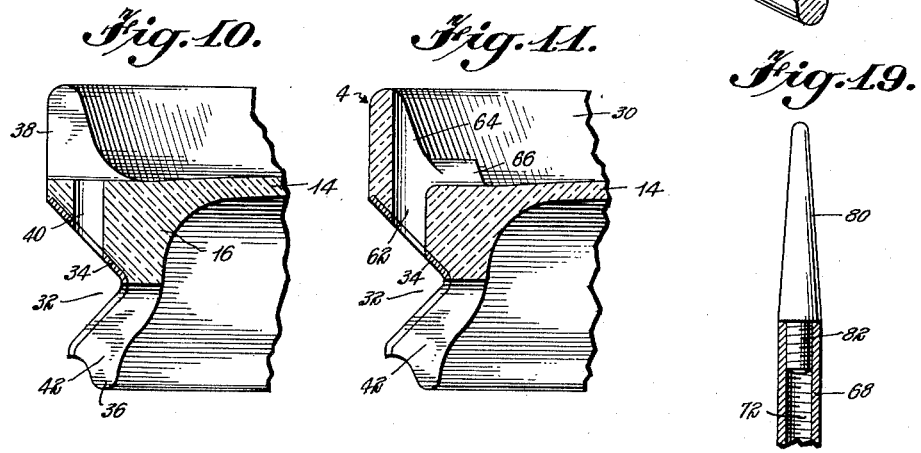
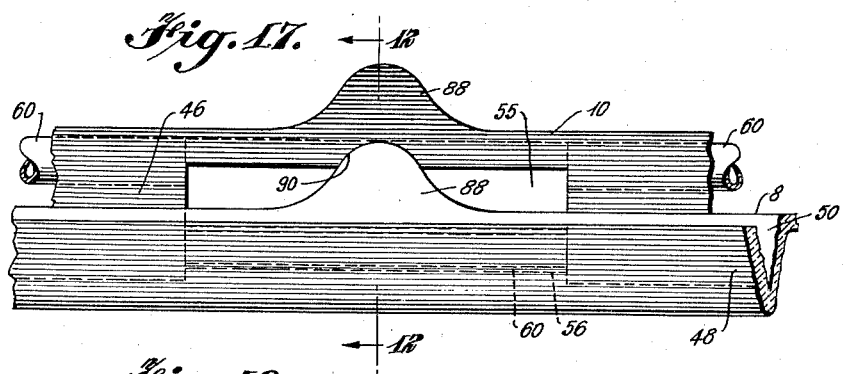
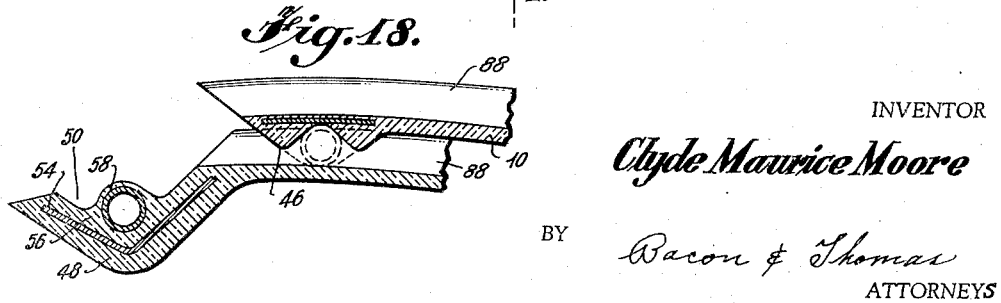
INVENTOR
*Clyde Maurice Moore*
BY *Bacon & Thomas*
ATTORNEYS Feb. 18, 1958
C. M. MOORE
2,823,826
INTERLOCKING PANELS AND JOINT
Filed April 12, 1955
7 Sheets-Sheet 4
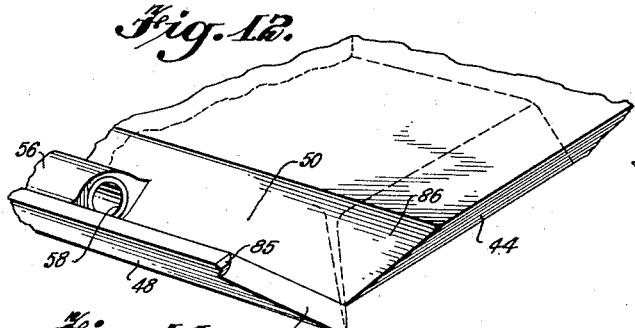
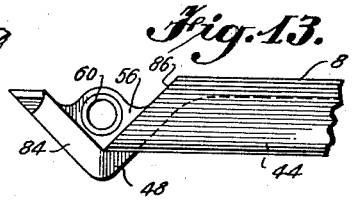
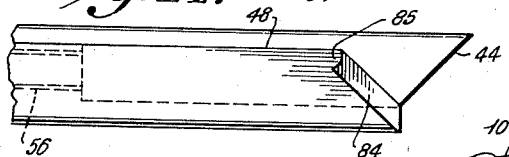
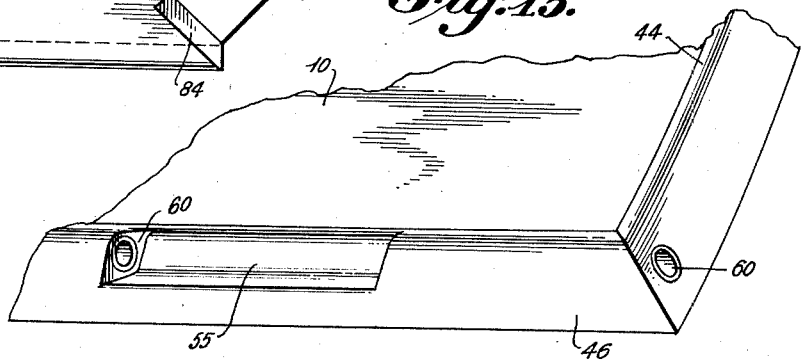
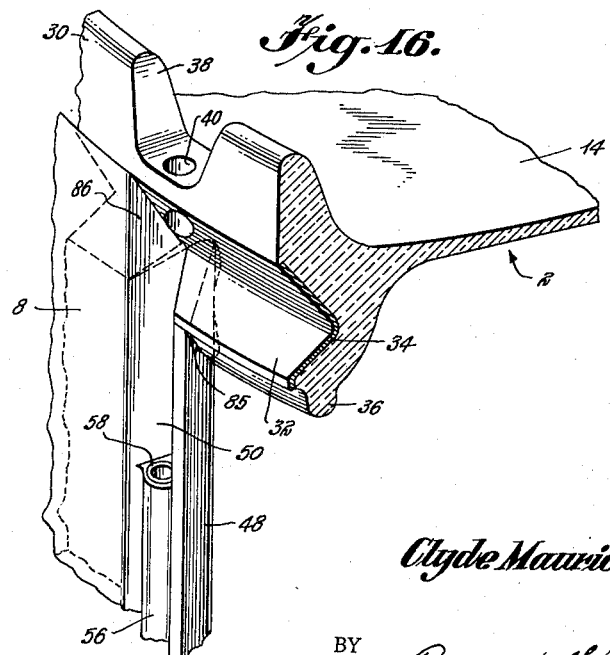
INVENTOR
Clyde Maurice Moore
BY Bacon & Thomas
ATTORNEYS Feb. 18, 1958 C. M. MOORE 2,823,826
INTERLOCKING PANELS AND JOINT
Filed April 12, 1955 7 Sheets-Sheet 5
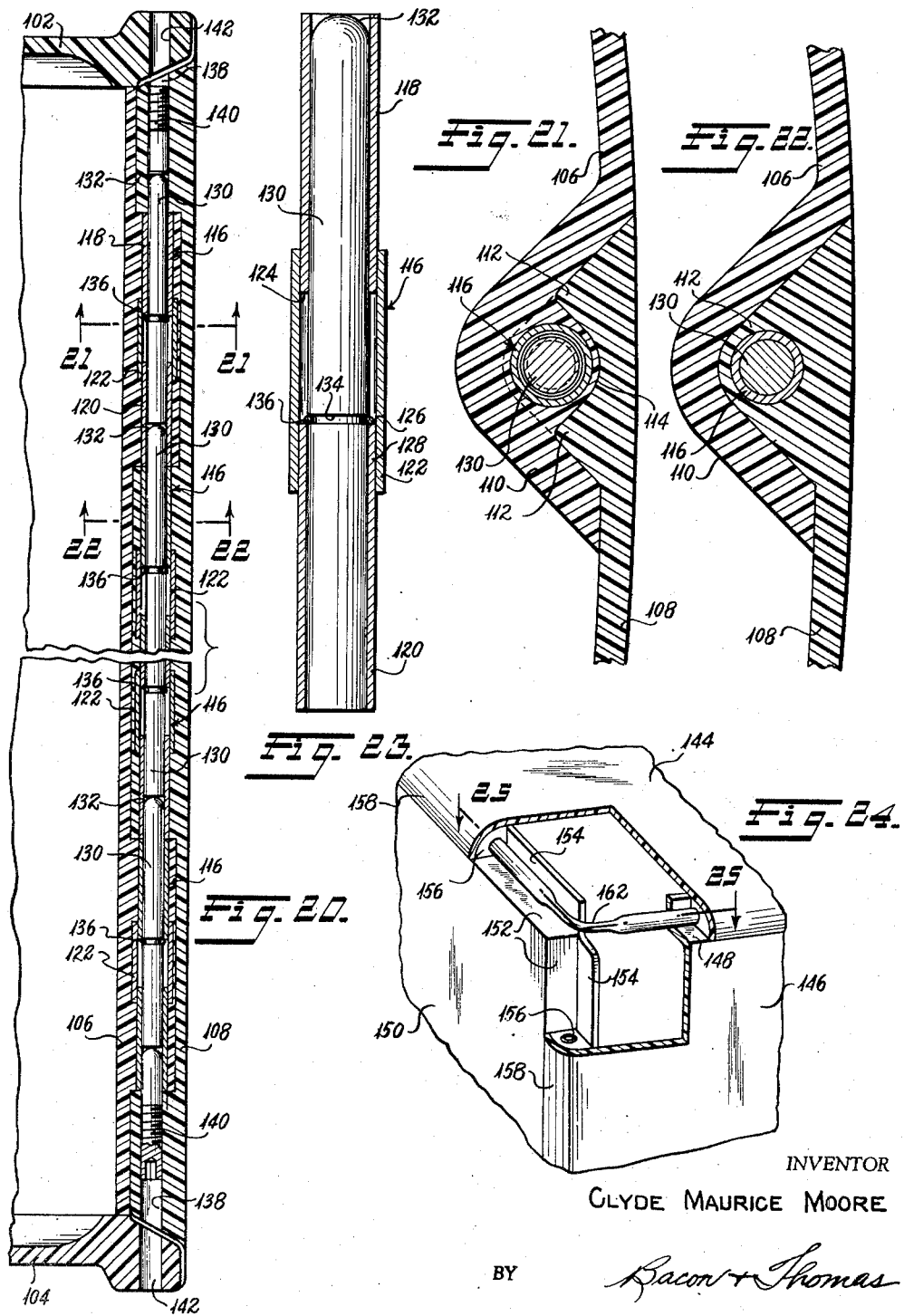
INVENTOR
CLYDE MAURICE MOORE
BY Bacon + Thomas
ATTORNEYS Feb. 18, 1958     C. M. MOORE     2,823,826
INTERLOCKING PANELS AND JOINT
Filed April 12, 1955     7 Sheets-Sheet 6
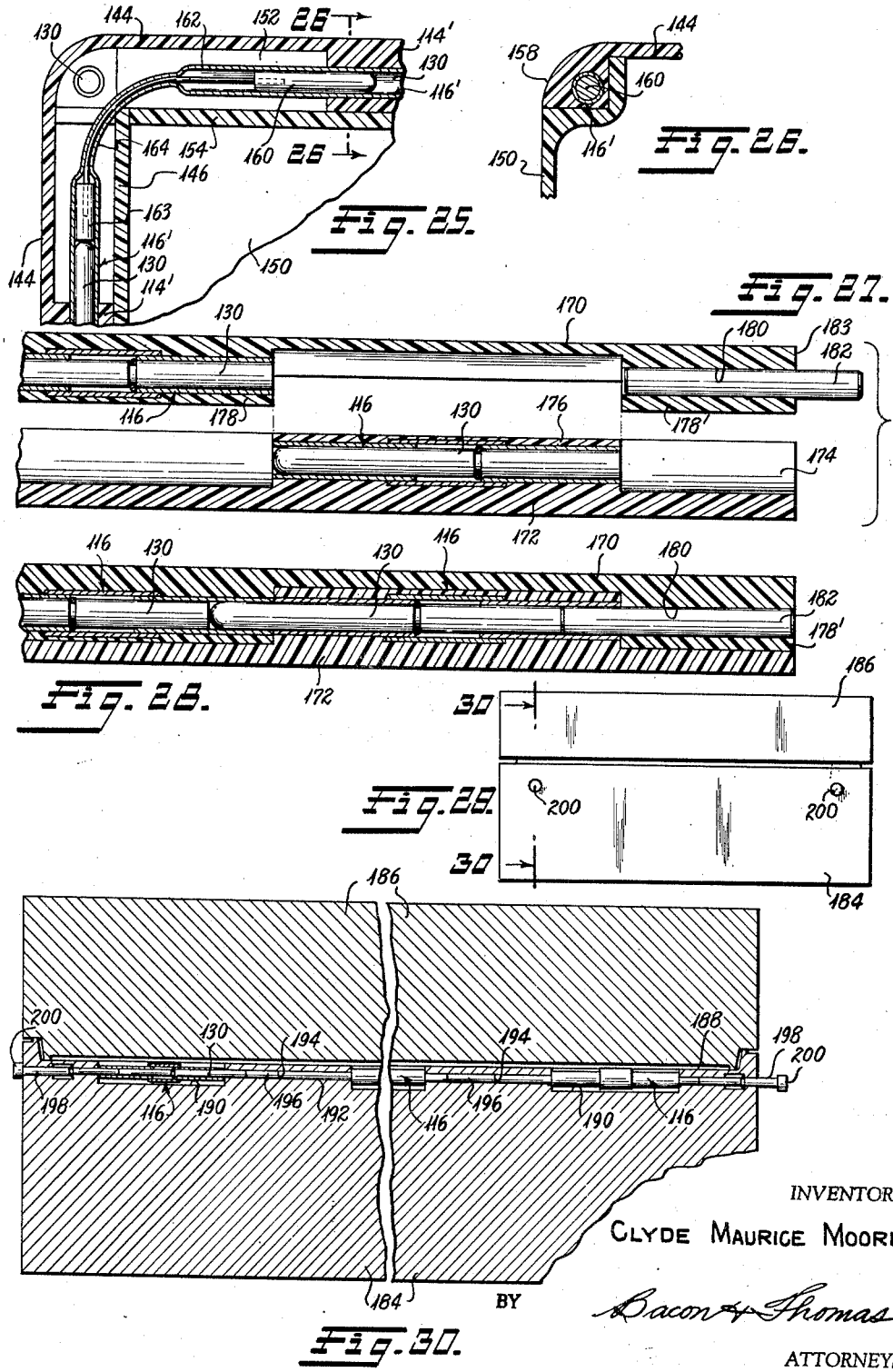
INVENTOR
CLYDE MAURICE MOORE
BY Bacon & Thomas
ATTORNEYS

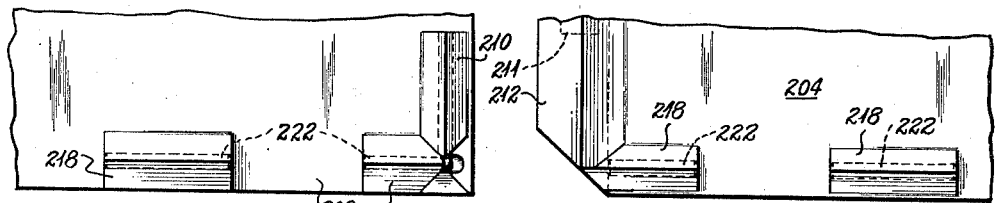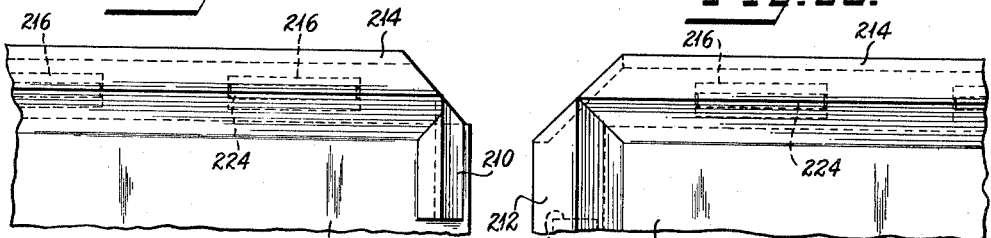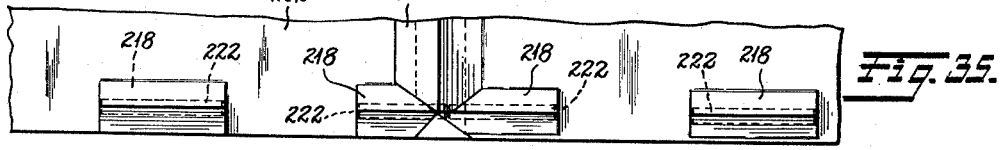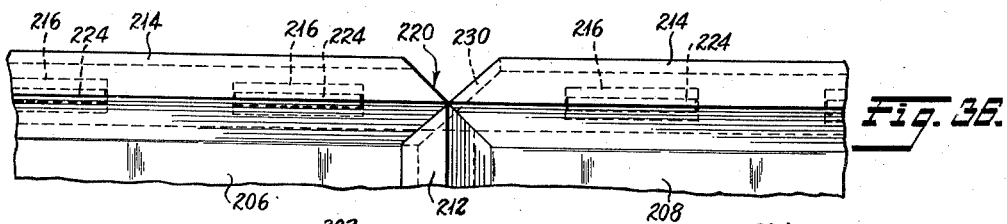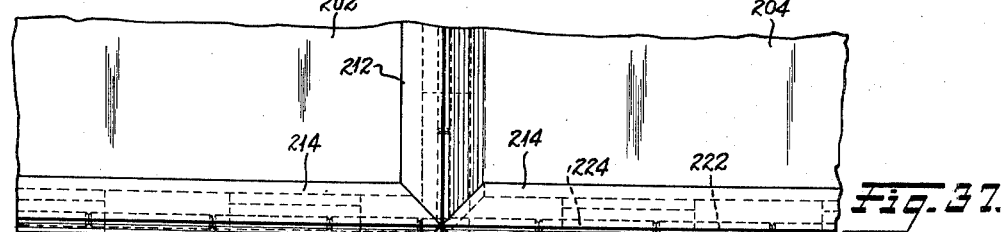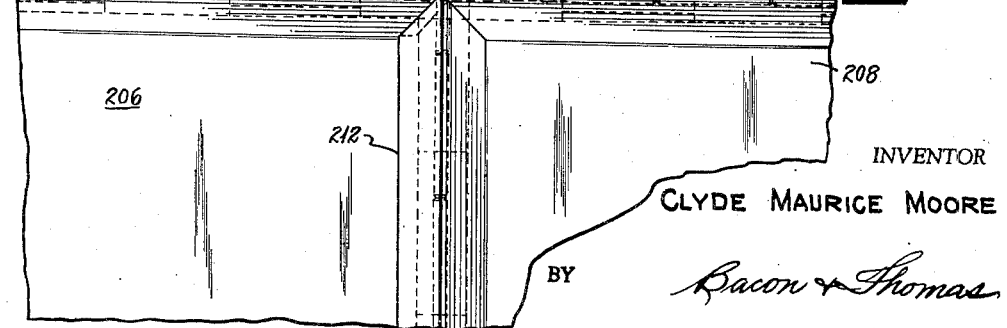

United States Patent Office 2,823,826
Patented Feb. 18, 1958

2,823,826

INTERLOCKING PANELS AND JOINT

Clyde Maurice Moore, Richmond, Va.

Application April 12, 1955, Serial No. 500,861

18 Claims. (Cl. 220—76)

This application is a continuation-in-part of my application Serial No. 234,831, filed July 2, 1951, and now abandoned, and relates to separable joints between panels of a structure. While the drawings and description relate principally to containers consisting of a plurality of separable panels that may be assembled and locked together to form a complete container, the invention is of general application and not limited to containers. In general, the invention relates to a prefabricated demountable structure having the component parts molded from a reinforced resinous material to render them impervious to most materials, of high mechanical strength, and highly resistant to weathering and other causes of damage.

The shipment and handling of liquid or gaseous materials is at the present time quite extensively practiced and presents a number of problems, particularly with respect to the containers employed for the materials. The usual type of container occupies a large volume of space when empty and necessitates considerable storage and shipping space. The present invention contemplates a container or other structure which can be disassembled for shipment or storage and also contemplates a suitable joint adaptable to containers made of materials not heretofore generally employed for such purposes.

It is necessary that a container be impervious and inert to the particular materials being handled. In present day commercial activity, it is necessary to handle many diverse types of liquid chemicals, many of which cannot be satisfactorily handled in containers made of conventional materials. It has been found that containers made of some thermosetting resins have the necessary characteristics to handle many of such chemical materials without deterioration of the container or contamination of the chemical. A well-known material, known to the trade as Fiberglas, has been developed which consists of a body of glass fibers which may be imbedded in the resin to impart structural strength to the product. Usually, the glass fibers occupy substantially the entire volume of the product and a suitable thermosetting resin bonds the fibers together and occupies all of the spaces therebetween and in addition defines the outer surfaces of the product. Articles of such material can be fabricated only by molding processes and to mold complete containers of the sizes demanded in commerce and other desirable structures would involve extremely large, expensive and bulky fabricating machinery. Such structures would still be subject to the disadvantage of being bulky to handle, even when empty, even though they offer substantial advantages otherwise. Among the advantages are lightness and toughness.

The present invention contemplates a construction of Fiberglas laminates in the form of panels so shaped as to be readily assembled to form the desired structure and means are provided for assembling and joining the panels at their edges to provide a completely sealed joint.

The disclosures made herein, while directed principally to the construction of Fiberglas containers, are nevertheless adaptable to structures constructed of other materials, such as metals, or to the construction of composite structures having portions of metal and portions of Fiberglas sheets.

In general a container, for example, under the present invention includes cylindrical side wall sections joined at their edges by means of interfitting rib-and-channel portions. The rib portions are cut away at spaced points and the channels are provided with projections nesting in the cutaways of the ribs and both the ribs and projections are provided with aligned openings through which fastening means extend. The fastening means not only hold the side wall panels in assembled relationship, but extend through end panels or drum heads to hold them assembled to the side wall. The disclosure in the present case is directed to a novel joint means that does not include sealing material but which provides a mechanically tight joint. In many instances it is desirable that the container be adapted for the handling of liquids, semi-liquids or gases, and in such cases the container may be coated on its interior surface with a layer of suitable material providing a flexible impervious and inert film covering the entire surface and extending across the mechanically tight joints to effect the required liquid seal, or, a thin flexible bag of suitable material may be used as a separate liner. The invention also includes a novel arrangement of parts where two or more joints intersect to effect a mechanical lock against displacement and a highly efficient mechanical seal at the intersection.

One of the objects of this invention is to provide a readily demountable container construction adaptable to containers having component parts molded of resinous material.

Another object of the invention resides in the specific novel joint structure between adjacent panels wherein a single fastener serves to hold the entire joint in assembled and tight relationship.

A still further object of the invention is to provide a novel construction at the intersection of joints between panels, such construction serving to mechanically lock the parts against lateral displacement and to effect an efficient mechanical seal.

Another object of the present invention resides in the provision of fastening means accessible from the exterior of a demountable container and container wall structure arranged to protect the exposed portions of the fastening means from accidental damage.

A still further object of the invention resides in the provision of integral roller rings on wall panels of a container and panel construction arranged to nest with the roller rings upon disassembly of the container and stacking of similar panels one upon the other.

Still another object of this invention is to provide a structure of interlocking panels wherein the interlocking portions of the panels contain their own movable locking elements.

A still further object of this invention is to provide a structure comprising interlocking panels wherein only simple tools are needed to effect assembly or disassembly of the structure.

A still further object is to provide a structure comprising a plurality of interlocked panels having movable locking means and wherein joints between different pairs of panels are serially arranged and means for simultaneously actuating the locking means of all those joints.

Still another object is to provide a structure having interlocking joints between adjacent panels and wherein means are provided for simultaneously actuating locking means extending along adjacent but different edges of one of the panels.

Another further object is to provide a joint structure having self-contained locking means so designed as to permit ready and facile alignment of the locking means relative to each other in a mold for forming the panels.

Further objects and advantages of the present invention will be apparent to those skilled in the art as the description proceeds in connection with the accompanying drawings, wherein:

Fig. 3 is a partial sectional view taken substantially along the broken line 3—3 of Fig. 2 with certain of the parts and details omitted for clarity of illustration;

Fig. 4 is an enlarged fragmentary sectional view taken along the line 4—4 of Fig. 3;

Fig. 5 is an enlarged fragmentary sectional view taken along the line 5—5 of Fig. 3;

Fig. 6 is a further and enlarged fragmentary sectional view taken along the line 6—6 of Fig. 2;

Fig. 8 is a perspective view of a portion of the bottom of the container of Fig. 1;

Fig. 9 is a perspective view of a portion of the top head of the container shown in Fig. 1;

Fig. 10 is a fragmentary radial sectional view through the structure shown in Fig. 9;

Fig. 11 is a view similar to Fig. 10 but being a section taken through the corresponding portion of the bottom wall or head of the container of Fig. 1;

Fig. 12 is a perspective view of a portion of one of the panels constituting the side walls of the container;

Fig. 13 is an end view of the structure shown in Fig. 12;

Fig. 14 is a side elevational view of the structure of Fig. 12;

Fig. 15 is a perspective view of a portion of a panel cooperating with the structure of Fig. 12;

Fig. 16 is a perspective view illustrating the relationship between the structure of Figs. 12 to 14 and the structure of Fig. 9 upon partial assembly of a container;

Fig. 17 is an edge elevational view of a pair of panels showing them in disassembled condition and stacked one upon the other for storage or shipping purposes;

Fig. 18 is a sectional view taken along the line 12—12 of Fig. 17;

Fig. 19 is a detail view of an accessory for use in assembling a container constructed according to the present invention;

Fig. 20 is a fragmentary axial sectional view through a modified form of joint locking means in a container or similar structure;

Figs. 21 and 22 are transverse sectional views, on an enlarged scale, taken along the lines 21—21 and 22—22, respectively, of Fig. 20;

Fig. 23 is a detail view of an insert and locking pin in the modification of Figs. 20 to 22;

Fig. 24 is a perspective view, parts being broken away, of a structure employing the present invention and illustrating a novel means for simultaneously actuating locking means along adjacent edges of one panel;

Fig. 25 is a sectional view taken substantially along the line 25—25 of Fig. 24;

Fig. 26 is a transverse sectional view taken along the line 26—26 of Fig. 25;

Fig. 27 is an exploded sectional view of a pair of panels in position to be assembled to form a joint according to the present invention;

Fig. 28 is a sectional view of the panels of Fig. 27 showing the same in assembled and locked relation;

Fig. 29 is an elevational view of a mold for forming panels embodying the present invention;

Fig. 30 is a sectional view through the mold of Fig. 29 taken substantially along the line 30—30;

Figs. 31, 32, 33 and 34 illustrate, respectively, four panels to be joined to form intersecting joints in a structure;

Fig. 35 shows the panels of Figs. 31 and 32 interlocked to form a first joint;

Fig. 36 shows the pair of panels 33 and 34 interlocked to form a second joint; and Fig. 37 shows the pairs of panels of Figs. 35 and 36 interlocked to form a third continuous joint.

Figure 1:
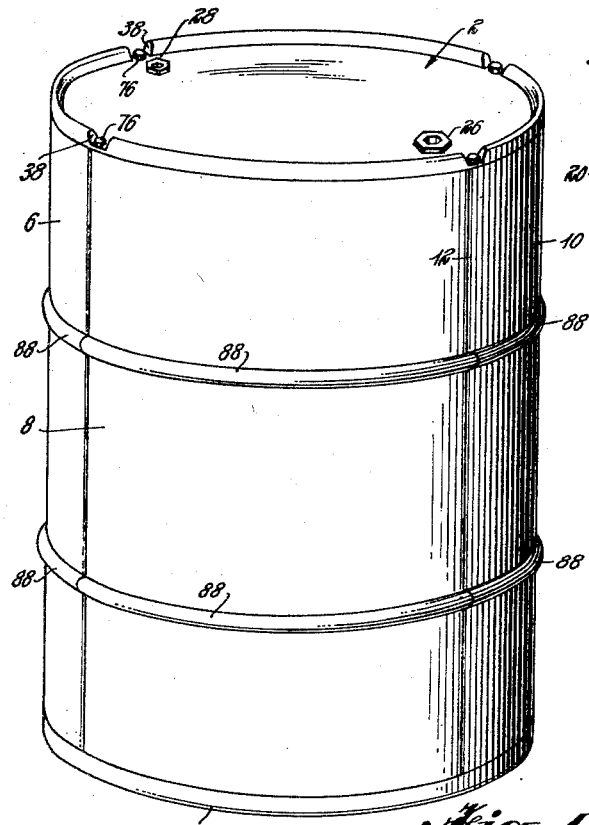
Fig. 1 is a perspective view of an assembled container embodying the present invention.

Referring first to Fig. 1, there is shown a container in the form of a cylindrical drum having a top wall or head 2, a bottom wall or head 4, and a plurality of side wall panels 6, 8 and 10. In the form illustrated there are four side wall panels corresponding to panels 6, 8 and 10, each being identical to the others and each circumscribing one-fourth of the circumference of the container. The panels 6, 8 and 10 are joined along adjacent edges to define axially extending joints 12 and suitable fastening means to be described in detail later, extend along the joints 12 throughout the entire extent thereof and project outwardly through the end walls or drum heads 2 and 4. The fasteners bear against the outer surfaces of the drum heads and hold the entire structure assembled.

Figure 2:
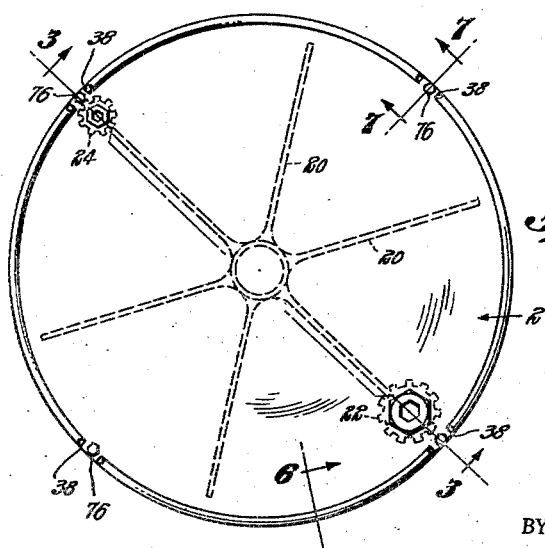
Fig. 2 is a top plan view of the container shown in Fig. 1.

Referring now to Fig. 3, and particularly the upper right-hand portion thereof, the head 2 is of one piece construction and molded from the resinous material previously referred to. The head 2 includes an upwardly convex central web portion 14 and a thickened peripheral portion 16. Centrally of the portion 14 is a reinforcing boss 18 and radiating therefrom are radial reinforcing ribs 20 molded integrally with the drum head (refer also to Fig. 2). At diametrically opposite points the central portion 14 of the drum head 2 is thickened and provided with imbedded inserts 22 and 24 in the form of tubular elements having internal threads. The imbedded inserts 22 and 24 may be provided with suitable serrated flanges to effect a mechanical lock with the material of the drum head and these inserts serve as threaded openings for suitable bung and vent plugs 26 and 28, respectively (see Fig. 1).

Reference is now made to Fig. 6 showing an enlarged sectional view of the edge portion of head 2. As stated previously, the central portion 14 terminates at its outer periphery in a thickened peripheral portion 16 having an upwardly extending flange 30 extending substantially completely around the periphery of the head and having an outer cylindrical surface in position to lie co-extensive with the outer surface of the side panels of the container. The thickened portion 16 also projects downwardly from the web portion 14 and is configured to provide a circumferential outwardly facing generally V-shaped channel 32. The channel 32 is preferably lined with a metallic strip 34. The strip 34 may be rolled or otherwise formed to the desired shape and joined at its abutting ends by welding or otherwise and may be incorporated in the mold at the time the head 2 is fabricated. It will be clearly seen that the liner 34, which is preferably of aluminum, is permanently fixed to the head 2 since it cannot be removed from the groove or channel 32. At the lowermost edge of the thickened portion 16 and below the channel 32 is a downwardly directed circumferential bead 36 spaced inwardly from the outer edge of the lower wall of channel 32. The bead is of such configuration that a pair of heads constructed similar to the head 2 may be stacked one upon the other with the bead 36 nested within the upper portion of the flange 30 to retain the heads against lateral displacement and facilitate stacking and storage thereof.

Referring now to Fig. 9, each of the circumferentially spaced portions of the head 2 adjacent the terminus of each joint 12 is formed as shown in Fig. 9. The flange 30 is cut away as at 38 down to the level of the upper surface of web 14 and an axially directed opening 40 extends through the upper surface of the drum head at the cut away portion and communicates with the channel 32 as shown. In line with the opening 40 the lower wall of the channel 32 is notched as at 42 from its outermost edge upwardly to substantially the mid-portion or bottom of the V-shaped channel 32. The edges of the notch 42 define surfaces extending in a generally radial direction relative to the drum all as clearly shown in Fig. 9. Fig. 10 illustrates in section the structure just described and further shows the radial direction of the side edges of the notch 42.

As previously stated, the panels 6, 8, 10 and the fourth panel not shown, in Fig. 1 are of identical construction. Each panel is arcuate in shape and defines a segment of a cylinder having axially extending edge portions. The upper and lower arcuate edges of each panel are each provided with an inwardly directed rib 44 of a shape complementary to the transverse sectional shape of the channel 32 and are nested therein. As evident from Fig. 6, the wall thickness of the major portion of the panels is relatively small and the lowermost wall of the V-shaped channel 32 does not extend radially outwardly as far as does the upper wall of that channel. The difference in radial extent between the walls of the channel is substantially equal to the thickness of the major portion of the side wall panels so that when nesting in the assembled relationship shown in the drawings the outer surfaces of the wall panels are co-extensive with the outer surface of the flange 30 to define a smooth unbroken outer surface for the drum.

One of the vertical edges of each panel is provided with an inwardly extending rib 46 (see Fig. 5) and the opposite edge of each wall panel is provided with an integral offset portion 48 configured to form a channel 50 complementary in shape to the rib 46. When assembled as shown in Fig. 1, each edge of each panel meets with an edge of an adjacent panel, which edge corresponds in structure to the opposite edge of the first panel. Preferably, the edge portion of the panel carrying the rib 46 has imbedded therein a ribbonlike metallic reinforcement 52 extending substantially the full length of the panel edge. If desired, the reinforcement 52 may be provided with openings to receive molded material to insure an effective bond between the parts and secure locking of the reinforcement within the panel structure. Such openings would further insure proper flow of the resin during the molding operation. In like manner the edges of the panels that are provided with the channels 50 also include imbedded ribbonlike metallic reinforcing strips 54. Preferably and necessarily the strips 52 and 54 are preformed, such as by rolling or the like, and placed in the mold at the time of fabrication of the wall panels.

Figure 7:
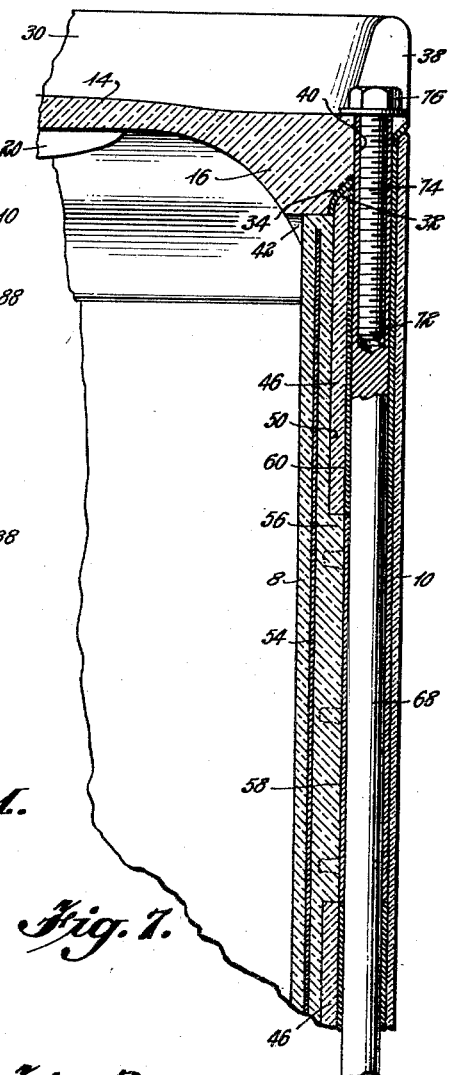
Fig. 7 is an enlarged fragmentary section taken along the line 7—7 of Fig. 2.

The ribs 46 do not have the same configuration as that shown in Fig. 5 throughout their entire length but spaced portions thereof are cut away as shown in Figs. 4, 15 and 17 at 55. Preferably, the portions cut away as shown in Fig. 4 are of a length substantially equal to the uncut portions having the configuration of Fig. 5. The panel edges having the channel 50 therein likewise are not of the same sectional shape throughout their length but are provided with projections 56 (see Figs. 4, 12, 13 and 16) at those locations opposite the cut away portions 55 of the ribs 46 whereby to nest within those cut away portions and fill what would otherwise be voids in the joint. Reference to Figs. 3 and 7 shows the internested relationship of the structure described as viewed in section along the joint.

The projections 56 in channels 50 are provided with longitudinally extending tubular metallic inserts 58 defining openings extending longitudinally of the joint. The inserts 58 are welded as at 59 or otherwise secured to the reinforcing members 54 to be maintained spaced therefrom and to effect a lock between the insert 58 and the edge portion of the corresponding panel. The portions of the rib 46 that are of full section, as shown in Fig. 5, are also provided with longitudinally extending tubular metallic inserts 60 imbedded in the material of the rib and welded or otherwise secured to the reinforcement members 52. As evident from Fig. 7 of the drawings, the tubular inserts 58 and 60 are axially aligned when the panels are in the assembled relationship shown and define a continuous opening extending the full length of the joint 12.

The bottom wall or head 4 (see also Figs. 8 and 11) is generally similar to the head 2, identical parts bearing the same reference numerals, but the flange 30 on the bottom head 4 is not cut away in the same manner as head 2 is but is provided with the miter notch 42 at the opposite or lower end of each joint 12. An opening 62 opposite the notch 42 is in axial alignment with the opening 40 in the head 2. The opening 62 extends through the head 4 and part of flange 30, thus defining a channel 64 at the inner side of flange 30. Adjacent the channel 64 and on the outer surface of the web 14 of head 4 integrally molded projections 66 are provided on opposite sides of the channel 64.

With the parts assembled as shown in Figs. 3 and 7 an elongated fastener 68 is passed through the aligned openings in the panels and heads to hold the entire assembly in assembled relationship. The rod 68 is bent at its lower end to provide a short lateral portion 70 lying between the projections 66 on head 4 and bearing against the lower surface of web 14. The shank or body portion of the rod 68 extends through and occupies the openings defined by inserts 58 and 60 and extends upwardly through the opening 40 in head 2, its upper end being substantially flush with the outer surface of the head 2. The upper end of the rod 68 is further axially bored and internally threaded as at 72 and receives a bolt 74 having a head 76 and washer 78 bearing against the outer surface of the upper drum head 2. It will be obvious that the rod 68 must be inserted from the bottom of the container after the parts have been assembled and thereafter the cap screw 74 engaged and drawn tight to place the rod 68 under tension and maintain the container in assembled relationship.

To facilitate insertion of the rods 68 in the aligned openings of the heads and panels, an accessory 80 (Fig. 19) is provided. The accessory 80 consists of a tapered plug having a threaded shank 82 receivable in the threaded bore 72 of rod 68. The diameter of the base of tapered plug 80 is equal to the diameter of the rod 68 and the accessory has a rounded blunt end readily insertable through the openings even though they are not exactly aligned at that time and the tapered sides thereof will effect a wedging action to draw the openings into alignment for reception of the rod 68. After the rod 68 has been threaded through the openings, the accessory 80 may be removed and the bolt 74 applied as described. If desired, the accessory 80 may be kept with the parts of the container at all times such as by providing a clip or holder therefor on the bung 26 or at any other convenient location on the container.

The joints 12 between the side panels of the container extend to the joints between the upper edges of the panels and the upper drum head 2 and also to the joints between those panels and the lower head 4. Provision is made for locking the side panels to the drum heads independently of the rods 68 to relieve those rods of all shear stresses due to any tendency of the panels to shift circumferentially relative to the heads. As previously described, the drum head 2 is provided with notches 42 and Figs. 12 to 14 illustrate the construction of the upper portions of the side panels at the edges thereof forming the channels 50. As clearly shown in the drawings, the channels 50 are extended and mitered at their ends, as at 84 to a shape exactly complementary to the notches 42 and it will be evident that the mitered ends 84 are positionable within the notches 42 in snug nested relationship thereto. The small curved portions 85 engage the outer surface of bead 36 of the head to effect further reinforcement but may be omitted if desired by continuing the flat edge surfaces of miter 84 to the extreme outer edge of the channel structure. The ribs 44 extending along the upper edges of the side panels terminate at the inner face of the channels 50 and are provided with inclined end surfaces 86 co-extensive with the corresponding inner side face of the channel 50. Fig. 16 illustrates the portion of the side panels shown in Figs. 12 to 14 when assembled with the structure illustrated in Fig. 9 and it will be seen that the assembly provides a positive lock against lateral shifting of the panel 8 circumferentially about the head 2. Fig. 16 also illustrates the fact that the opening 40 through head 2 is in axial alignment with the opening through insert 58 in projection 56 of channel 50. The rod 68 will ultimately pass through these openings. It is also clear from Fig. 16 that the channel 50 is complemented by the end face 86 and cooperates with the channel 32 of head 2 to form a right-angle channel adapted to snugly receive the upper corner portion of an adjacent side wall panel 10. Fig. 15 illustrates the portion of the panel 10 receivable in the channels shown in Fig. 16. The panel 10 is provided with the upper rib 44 previously described which is formed integral with the panel and integral with the end portion of the rib 46 extending along joint 12. Fig. 15 clearly shows the cutaway portion 55 of the rib 46, described in connection with Figs. 4 and 5, and clearly illustrates how the projections 56 of channels 50 may nest therein to bring the inserts 58 and 60 into axial alignment. The lower corners of the side wall panels and corresponding portions of the lower head 4 are formed exactly as described in connection with Figs. 12 to 16 and need not be further described in detail. While the description has referred to panels 8 and 10 as being separate and apparently different panels, they are in fact identical. One upper corner of each panel is constructed as illustrated in Figs. 12 to 14 while the opposite upper corner thereof is constructed as shown in Fig. 15, thus the panels are interchangeable.

Referring again to Fig. 1 and Figs. 17 and 18, it will be noted that the side wall panels are provided with integral circumferentially extending ribs 88 on their outer surfaces. The ribs 88 on each panel define segments of roller rings and are so formed and shaped that the completely assembled container includes continuous rings around its periphery adapted to support the drum for rolling contact with a surface when lying on its side and also effecting substantial reinforcement of the relatively thin side wall panels. Each of the roller ring segments 88 extends to the edge of its panel and is so formed at its ends as to present surfaces co-extensive with the inner face of channel 50 at one end and with the outer face of rib 46 at the other end (see Figs. 4 and 18). When the parts are assembled to a complete container, the ends of the ring segments 88 are brought into abutment as shown in Fig. 4 to define a continuous ring around the periphery of the drum. When the panels and heads of the demountable drum of the present invention are disassembled they may be nested or stacked in a manner to occupy a minimum of space to facilitate storage or shipment thereof. The manner of nesting the heads 2 and 4 to each other has been previously described and it will be obvious that the side wall panels may be nested since they are of segmental cylindrical shape. The presence of the roller ring segments 88 on the side wall panels and the fact that the ribs 46 project inwardly of the inner face of the panels even at those locations where the ribs are cut away, would prevent the panels from lying close to the outer peripheries of the rings 88. From the drawings it is apparent that the ring segments 88 extend to the edge portions of the panels adjacent rib 46 at locations where those ribs are cut away to receive the projections 56 of a mating panel. Portions of ribs 46 even at those cut away locations extend inwardly of the inner surface of the panel wall and those inwardly projecting portions are cut away as at 90 (Fig. 17) to define circumferential notches complementary in shape to the outer edges of the roller rings 88. Thus, side panels may be nested and stacked in the manner shown in Figs. 17 and 18 with end portions of roller rings 88 on the lowermost panel received within the notches 90 to permit the lowermost ring segment 88 to contact the inner surface of the upper panel 10 throughout the entire arc of the panel. It has been found that the provision of the notches 90 will permit a substantially greater number of panels to be stacked in a given space than would otherwise be possible.

For purposes of storage and/or shipment, the rods 68 may be inserted in the openings at either edge of a panel and the cap screws temporarily replaced to prevent loss of the fastener rods during handling, shipment or storage.

The structure thus far described provides a demountable container having snugly interfitting portions defining joints and is perfectly satisfactory for the handling of a great variety of materials.

The illustrated embodiment includes four side wall panels, each extending throughout 90° of the periphery of the drum. Since the components of the drum are of molded resinous material, it is necessary that all portions thereof be so angularly related that they may be readily removed from the forming mold. Referring again to Figs. 4 and 5, the tapered side faces of the ribs 46 and the channels 50 must be so angularly positioned that the molded panels may be readily removed from the mold. Since each panel is provided with a rib 46 at one edge and a channel 48 at the other and since each panel defines a 90° arc, it is clear that the included angle, identified by A in Fig. 5, must not be less than 90°. If that angle is exactly 90°, the inner face of the rib will be exactly parallel to the inner surface of the channel at the opposite edge and some difficulty will be experienced in stripping the molded panel from its forming mold. Preferably, the angle A is slightly greater than 90°, an angle of 92° has been found satisfactory. With the ribs and complementary channels formed to an included angle of 92°, it will be evident that the parts interfit with a "wedging" action to firmly hold the abutting surfaces together and effect an efficient mechanical joining of the panels along a relatively tight joint.

The mechanically tight joint thus far described would not provide a sufficiently tight container for the handling of many liquid products and particularly petroleum products of low specific gravity. To adapt the present demountable container for handling of such liquid materials, it is necessary that sealing means be provided to hermetically seal the entire container and particularly at the joints thereof. A satisfactory manner of providing such a seal resides in providing the entire inner surface of the assembled container with a film or layer 92 (see Figs. 4, 5 and 6) of a suitable sealing material of sufficient flexibility to withstand the flexures to which the panels may be subjected and adhering to the walls of the container. The film or layer may be applied in liquid form to spread a film over the entire inner surface of the drum and allowed to set or harden to a solid state. Modifications of materials presently available on the market and sold under the trade names "Primoid" and "Corosite" have proven satisfactory for this purpose in many instances. It will be apparent that the material of the film or layer 92 must be inert to the particular material being handled and may be applied in the form of an emulsion or solution of a suitable rubber or synthetic rubberlike material or may, in some instances, consist of a dispersion or solution of silicone resin. Such a film may be satisfactorily applied by introducing into the assembled container a quantity of the liquid material in excess of that necessary to provide the film and by manipulating the container to cause the liquid to flow over all surface portions of the inside and then draining the excess off. After the film has set, the container is ready for use. A container so sealed may be readily disassembled in the obvious manner which would, of course, result in tearing the film 92 at the joints. The film may then be stripped from the inner surface of the panels or may be removed by suitable solvent or heat treating processes. Upon reassembly of the parts a new film will then be provided in the manner described.

During the dispersion of the liquid over the surface of the drum to provide the seal, in the manner described above, it may be advantageous to seal the drum and introduce compressed air or the like to maintain a pressure therein somewhat greater than atmospheric pressure to insure entry of the film forming material into small crevices and cracks at the joints to more effectively seal the joints against leakage of liquid materials. A pressure of about 7 pounds per square inch above atmospheric pressure has been found satisfactory for this purpose.

As previously indicated, the material of the panels and drum heads preferably consists of a reinforced thermosetting resin material. A satisfactory structure comprises a mat core of fibrous glass between inner and outer layers of plastic-impregnated glass cloth. Preferably the layers of cloth lie closely adjacent the outer surfaces of the panels to confine the mat core during the molding process and to impart great structural strength to the panels. Suitable fibrous glass mat and glass cloth are obtainable under the trade name of "Fiberglas."

At the portions of the panel where the sections are thickened, such as at the edges defining the channels and ribs for the joints, the roller rings, the flanges on the drum heads, etc., extra filling material of glass fiber mat or cloth is provided since those portions of the structure are subjected to excessive impact loads and must be constructed sufficiently strong to withstand those impacts. Although it is preferred to use Fiberglas reinforcement, clearly other materials may be employed as a filler or reinforcing medium for the panels.

At certain locations in the panel construction it has been found necessary to employ additional layers of impregnated glass cloth. Reference to Fig. 4 indicates that the top or outer surface of the metal insert 58 lies very close to the outer surface of the projection 56. At this point, and any other similar locations in the structure, it is preferred that several layers of glass cloth lie over the insert 58 and extend downwardly into the body of the projection to satisfactorily lock the projection to the panel edge. It will be realized that considerable lateral force exists tending to pull the insert 58 outwardly of the channel when the container is assembled and the extra layers of glass cloth provide a suitable joint between the insert and the body of the material. At the portions having such thin sections as that just described, no fibrous mat is employed between the layers of glass cloth.

While it is contemplated that any suitable thermosetting resin may be employed, it is preferred that the container be constructed of a polyester resin. A satisfactory resin is available on the market under the trade name of "Laminac," distributed by the American Cyanamid Company. Preferably, the resin is impregnated with a suitable metallic pigment or powder, such as the aluminum powder pigments with which many resins are commonly impregnated at present. Such a pigment in the material imparts to the product a constant desirably uniform appearance. The "Laminac" resin referred to is of the "low pressure" type from which products may be molded by processes involving very low mold pressures.

During the molding operation of the side panels the reinforcing strips 52 or 54 with their associated tubular inserts are positioned within the mold and it will be clear that the shape of the mold corresponds to the contour of the panel structure intended to cooperate with the particular one being considered. Those parts of the mold corresponding to the projections 56 will abut against the ends of the inserts 60 and thereby plug the open ends thereof to prevent entry of plastic material therein during the molding operation. If desired, separate plugs may be inserted in the inserts and such plugs may consist of suitable core material removable by heat or solvents.

Preferably the fasteners 68 and bolts 76, along with the bung and vent plugs 26, are of corrosion-resistant metal or so treated as to be resistant to the materials being handled and weather. It has been found that a thin plating of cadmium on steel members provides a satisfactory protective coating.

The container herein described and hereinafter claimed is for use under conditions where no satisfactory demountable container has heretofore been available. For instance, in shipping food products and in handling military supplies such as gasoline, oil, napalm, etc., the present invention proves highly valuable since it may be easily assembled or disassembled in the field, without specialized tools or equipment, and since it occupies so little space when disassembled.

Referring now to Figs. 20 through 23, the joint of this modification is shown embodied in a container or similar structure having end walls 102 and 104 and a plurality of side panels including panels 106 and 108. In general, the shape of the panels of this modification are the same as those described in connection with Figs. 1 through 7. Adjacent edges of the side panels 106 and 108 are provided with overlapping portions, one of which defines a channel 110 (see Figs. 21 and 22) and the other of which is provided with aligned but axially spaced rib portions 112. Like the previous embodiment, projections 114 are located in the channel 110 in position to occupy and fill the spaces between the aligned ribs 112. Each of the ribs and projections is provided with a longitudinal opening therethrough in which a locking insert 116 (see also Fig. 23) is embedded. The openings defined by the inserts 116 define a continuous closed passageway extending the length of the joint between the panels 106 and 108.

The inserts 116 are all identical in construction and, as shown, comprise metal tubes 118 and 120 telescopically fixed in opposite end portions of a slightly larger metal tube 122. The opposed ends 124 and 126 of the tubes 118 and 120, respectively, are spaced apart and define, with the inner surface of tube 122, an annular chamber 128 between the ends of the insert 116. A locking pin 130 is slidably positioned in the insert 116 and its length is substantially exactly equal to the overall length of the insert. Preferably, one end of the pin 130 is rounded, as at 132, whereas its other end is left flat. If desired, the insert 116 could be a single integral tubular element enlarged intermediate its ends to provide the chamber 128 and shoulders 124 and 126.

The pin 130 is provided intermediate its ends with a circumferential groove 134 in which a split ring 136 is positioned. The groove 134 is preferably of such radial depth that the split ring 136 may be radially contracted to lie completely within the outer periphery of the pin 130. By this construction, the tubes 118, 120 and 122 may be assembled and permanently fixed together and thereafter the pin 130 may be inserted into one end of the insert 116 and ring 136 may be contracted to pass through either tube 118 or 120. When the pin has been inserted to a position where the ring 136 is within the chamber 128, the ring expands to the position shown in the drawings and locks the pin 130 in the insert. The parts are so proportioned and positioned that when ring 136 abuts the end face 126 of tube 120, the pin 130 is entirely and completely contained within the insert 116 with its ends in substantially flush relation with the corresponding ends of the insert and the ring 136 frictionally holds the pin 130 in that position by virtue of its tendency to expand radially. When the pin 130 slides axially through the insert 116 to a position where ring 136 abuts end face 124 of tube 118, the rounded end of the pin projects a substantial distance from the corresponding end of the insert.

Although inserts 116, pins 130, and rings 136 have been described as metal, they are not necessarily so. They may be of any other suitable material where it is desired to exclude all metal from the structure.

As previously described, the ribs on panel 108 and projections in channel 110 are each provided with an insert of the type described in connection with Fig. 23 and all the inserts are in axial alignment when the panels are in assembled relationship.

As shown in Fig. 20, the upper and lower ends of the joint are defined in part by passageways 138 in panel 108 outwardly of the last insert. Each of the passageways 138 is provided with a member 140 threaded therein for axial movement along the passageway. The end walls 102 and 104 are provided with passageways or openings 142 in alignment with the passageway of the joint and through which a suitable wrench or tool may be inserted to engage and actuate either of the threaded members 140 for movement in either direction along the joint passageway.

Fig. 20 shows the joint with the panels locked together to form the desired structure. In this condition a suitable tool may be inserted in the lower opening 142 and the lowermost member 140 may be rotated to thread itself downwardly in the passageway 138 and thereafter the upper threaded member 140 may be threaded downwardly and thereby push all the pins 130 downwardly until each is completely contained within its corresponding insert 116. When that condition is reached, the split rings 136 engage the surfaces 126 and stop the pins 130 with their ends flush with the ends of their corresponding insert 116. In this position the panels are not locked and panels 106 and 108 may be readily separated laterally, as shown in Fig. 27.

To assemble a structure embodying this joint, the ends of pins 130 must be in flush relation with their inserts 116 and releasably held there against accidental displacement, the panels are then positioned to nest their respective ribs and projections with each other, and the lowermost threaded member 140 may then be screwed upwardly to slide the entire row of pins upwardly so that each projects from its own insert and partially into the insert thereabove to positively lock the panels together and thereby lock the structure in assembled relation.

Referring now to Figs. 24, 25 and 26, the structure shown therein may be of generally cubical shape and may be a container or any other desired structure. In this form of the invention side panels 144 and 146 are joined together along a joint 148 but in angular relationship to each other whereby a corner of the structure is formed. Transverse edges of the panels 144 and 146 are jointed to an end panel 150 to form a 3-panel corner of the structure.

The joints employed with this modification are essentially the same as that described in connection with Fig. 20, the channel of the end panel 150 being formed by flanges 152 and 154 having spaced projections (not shown) integrally formed therein. The overlying edge portions 158 of the panels 144 and 146 are provided with spaced aligned rib sections 156 adapted to fit and nest between spaced projections of panel 150. Each of the rib sections of the side panels and the projections in the channels of the end panel are provided with inserts which may be identical to that shown and described in connection with Fig. 23. In this modification, an end pin 160 (see Fig. 25) on the panel 144 is fixed to a flexible compression member 162 and the latter extends around the corner of the panel 144 and is fastened at its other end to an end pin 163 on the adjacent edge of the panel 144. In this construction the inserts 116' in those projections 114' nearest the corner of the panel 144 are of somewhat different construction than that shown in Fig. 23. In this case the inserts 116' on adjacent edges of the panel 144 constitute a single member extending around the corner of the panel and including a portion 164 of reduced diameter, through which the flexible compression member 162 extends loosely. As will be obvious from Fig. 25, pins 130 at the upper edge of panel 144 are moved to the left, the end pin 160 pushed ahead of them and, through flexible compression member 162, the end pin 163 will be pushed downwardly and that, in turn, will push the row of vertical pins 130 downwardly, when it is desired to actuate the locking means. Thus, by manipulating a single element at one corner of the panel 144, all the pins on at least two edges of that panel may be actuated in either direction to lock or unlock the structure. Clearly, the structure here described could be employed to simultaneously actuate all of the locking pins on any selected number of adjacent edges of a panel.

Figs. 27 and 28 illustrate a modified form of means for actuating the locking pins previously described. The interlocking joint of the present invention is readily adaptable for locking together the panels of structures other than containers. Figs. 27 and 28 illustrate, in a broad way, a pair of panels adapted to be locked together and employed in any desired structure. The panels 170 and 172 are provided with overlapping edge portions, one of which defines a channel 174 having spaced projections 176 therein and the other of which is provided with spaced but aligned rib sections 178 and 178' complementary to the channels 174. Each of the rib sections 178 and projections 176 has an insert 116 embedded therein and its associated pin 130 slidable therethrough. As is clearly evident from Fig. 27, when the pins 130 are wholly contained within the insert and with their ends flush with the ends of the insert, the panels may be readily separated or assembled by simple lateral movement of the rib sections 178 outwardly of the channels 174. The condition illustrated in Fig. 27 obtains also in the modifications of Figs. 20 and 24 under the described conditions. When the panels 170 and 172 of Fig. 27 are moved into interlocking nested relationship, they assume the relative positions shown in Fig. 28. The rib section 178' of panel 170 need not be provided with an insert 116 but may have merely a bore or passageway 180 therethrough in alignment with the openings through the inserts 116. A pin 182 is slidably positioned in the passage 180 and is of such length that when its inner end is flush with the inner end of the rib 178' (as shown in Fig. 27) its outer end projects a substantial distance beyond the end of the joint and a transverse edge 183 of the panel 170. When the panels have been moved to the interlocking relation shown in Fig. 28, the end pin 182 may be pushed or driven inwardly to the left, to the position shown in Fig. 28, and will thereupon drive the entire row of pins 130 ahead of it into position to lock the panels in assembled relationship. It is contemplated that the other end (not shown) of a joint as shown in Fig. 28 be also provided with a passageway corresponding to the passageway 180. Preferably, however, no pin is located in that passageway. When it is desired to disassemble the panels, any suitable tool may be inserted in the passageway at the other end of the joint and thereby the entire row of pins 130 may be moved to the right to assume the position, relative to their corresponding inserts 116, as shown in Fig. 27, whereas the panels may be readily separated.

Figs. 29 and 30 illustrate a mold suitable for the production of panels incorporating the present invention. The mold preferably comprises a lower body portion 184 and an upper portion or cover 186. The mold portions 184 and 186 are provided with suitable cavities defining a chamber 188 of the exact shape and dimensions of the outer surfaces of the panel to be molded. The lower portion 184 may be provided with recesses 190 in which the ribs or projections of the panel are formed. The portions 192 of the mold correspond in size and shape to the ribs or projections to mate with the rib or projection formed in the cavity 190. The extensions 192 are provided with aligned openings 194 in which pins 196 are slidable. The outermost edge portions of the mold are provided with passageways aligned with the passageways 194 and in which drive pins 198 are mounted. Each of the drive pins 198 may be provided with a head 200 and which is of such length that the head 200 is at all times outside the outer surface of the mold. Preparatory to molding a panel in the mold shown, inserts 116 are positioned in the cavities 190 with their pins 130 in the relative position shown in Fig. 23. With the inserts 116 thus positioned in the cavities 190, the end pin 198 may be driven inwardly to project the pins 130 into interlocking relation with the passageways 194 and at the same time project pins 196 into interlocking relation with the aligned end of an adjacent insert 116. Thereafter, the cover or top portion 186 is placed on the mold body 184, clamped or held thereon by any suitable means, and a panel molded in the mold chamber 188. By the means shown and described, all inserts 116 are imbedded in the material of the panel and are positively positioned in correct axial alignment with each other.

After the panel is molded and cured, the pin 198 at the right side of Fig. 30 may be driven to the left to unlock the molded panel from the mold and permit its ready removal.

Referring now to Figs. 31 through 37, Figs. 31 through 34 show panels 202, 204, 206 and 208. It is contemplated that the four panels be joined to form a 4-panel subassembly constituting a part of a larger structure. It is further contemplated that the edge portions of panels 202 and 208 shown in Figs. 31 and 34, and the portions of panels 204 and 206 shown in Figs. 32 and 33, respectively, illustrate diagonally opposite corners of identical panels. In other words, the four panels shown in these figures are of identical construction, the lower right hand corner being as shown in Fig. 31, the lower left hand corner being as shown in Fig. 32, the upper right hand corner being illustrated in Fig. 33 and the upper left hand corner being as illustrated in Fig. 34. In this form the right hand edge of each panel is provided with spaced aligned ribs 210 and the left hand edge of each panel is provided with a continuous channel 212 complementary to the ribs 210 and having projections 211 therein. The ribs and projections may be provided with the inserts and pins previously described. The uppermost edge of each panel is provided with a continuous channel 214 in which spaced projections 216 are molded, corresponding to the projections in the channels in the previous embodiments. The lowermost edge of each panel is provided with spaced aligned rib portions 218. The projections 216 and the rib portions 218 may also each be provided with the inserts and pins referred to and which are in alignment when the panels are in assembled relation, as described in connection with the previous modifications.

It will be clear that the panels 202 and 204 may be assembled by placing ribs 210 in channel 212 and the associated pins moved to locking position. Panel 206 may be assembled to panel 208 in the same manner to produce the interlocked pairs of panels illustrated in Figs. 35 and 36. In this condition of assembly, the channels 214 along the upper edges of the panels 206 and 208 extend continuously across the joint between those panels except for the notch 220 extending downwardly to about the center of the channels 214. The channel 212 on panel 204 is provided with a pointed lowermost end complementary to the notch 220 and the rib portion 218 on panel 204 constitutes an extension of the endmost rib portion 218 of panel 202. As illustrated in Fig. 35, each of the rib sections 218 is provided with a slidable pin 222 in its longitudinal opening and the projections 216 of Fig. 36 are also each provided with a pin 224 in their longitudinal openings.

The pair of panels shown in Fig. 36 may then be placed with their upper edges in overlying relation to the lower edges of the pair of panels shown in Fig. 35 with the rib portions 218 nesting between the projections 216, all as shown in Fig. 37. Thereupon an end pin (not shown) on one of the panels may be pushed inwardly to thereby move all the pins 222 and 224 into interlocking relation with the passageways on an adjacent panel and thereby lock the four panels in the assembled relationship shown. By this means, applicant has provided a panel structure capable of assembly in any required or desired numbers to form a multitude of different structures.

The assembled panels 206 and 208 of Fig. 36 could be a single panel having the notch 220 therein for mating with the panels of Fig. 35 to form a T-joint. It is to be noted that the edge surface 230 of the notch 220 is parallel to the outer surface of channel 212 (Fig. 35) which it abuts when the structure is complete, without any voids between the parts.

If desired, the passageway along the joint, the inserts 116, and/or pins 130 may be omitted and the panels held in assembled relation by other means, such as by a tension band or strap surrounding the entire structure.

While a limited number of embodiments of the invention have been shown and described herein, it is to be understood that many modifications and equivalents may be resorted to without departing from the scope of the invention as defined in the appended claims.

I claim:

1. A demountable container comprising, adjacent wall panels having overlapping edge portions defining a joint, said overlapping portions being further provided with alternating projections along said joint and extending transversely thereto but between said overlapping portions and concealed therebetween, the opposed outer surfaces of said overlapping portions being continuous and uninterrupted, said overlapping portions of each panel further having continuous free edges engaging the other panel adjacent the juncture between said other panel and its overlapping portion, said projections being provided with aligned openings defining a continuous peripherally closed passageway extending along said joint, and rigid fastener means extending along said joint and through said aligned openings to hold said panels in assembled relationship.

2. A container as defined in claim 1 including end panels arranged transverse to said wall panels and extending across said joint, said end panels having edge portions interlocking with adjacent edges of said wall panels at interfaces extending generally transverse to said wall panels, said fastener means comprising an elongated rigid fastener having end portions extending through said end panels, and means carried by said fastener bearing against the outer face of each of said end panels.

3. A demountable container comprising, adjacent wall panels having overlapping edge portions defining a joint, one of said edge portions being provided with a continuous channel extending along said joint and facing said other edge portion, the other of said edge portions having a rib complementary to said channel and nested therein; longitudinally spaced portions of said rib being cut away; said channel having projections therein, said projections being complementary to and nested in said cut away portions, the opposed outer surfaces of said overlapping edge portions being continuous and uninterrupted, said rib and said projections being provided with aligned openings extending along said joint, and rigid fastener means extending through said aligned openings to hold said wall panels in assembled relationship, said overlapping portions of each panel further having continuous edges engaging the other panel adjacent the juncture between said other panel and its overlapping portion.

4. A demountable container comprising, adjacent wall panels of reinforced resin material having overlapping edge portions defining a joint, one of said edge portions having a V-shaped channel integral therewith and extending along said joint and facing said other edge portion, an elongated metallic reinforcing member of V-shape, transverse section imbedded within the material of said channel walls, the other of said edge portions having an integral rib complementary to said channel and nested therein, a ribbonlike metal reinforcing member imbedded in said other edge portion adjacent the base of said rib, longitudinally spaced portions of said rib being cut away, said channel having projections therein complementary to and nested within said cut away portions, said rib and said projections being provided with aligned openings extending along said joint, tubular metallic liners in said openings, each of said liners being secured to the imbedded reinforcing member of the corresponding edge portion, and an elongated fastener extending through said aligned openings to hold said adjacent panels in assembled relationship.

5. A demountable container comprising an end panel having a first channel along one edge thereof, one side of said channel having a notch extending substantially to the mid portion of the channel, a pair of adjacent wall panels having edge portions extending transversely of said channel at said notch, the edge portion of one adjacent panel defining a second channel formed at one end complementary to said notch and nested therein to define intersecting channels forming a T at said notch; the panel having said second channel having a rib projecting from an adjacent edge and nested in said first channel on one side of said notch, the other of said adjacent panels having a rib on its said edge portion nested in said second channel and a rib on its adjacent edge nested in said first channel on the other side of said notch, and a fastener extending through said end panel and notch and engaging each of said adjacent panels.

6. A container as defined in claim 5 wherein the ribs on said adjacent panels nested in said first channel extend into end abutment with each other along a surface coextensive with one side of said second channel.

7. A structure comprising, a pair of adjacent panels having overlapping edge portions defining a joint; an edge portion of one of said panels comprising a continuous channel extending along said joint and facing said other edge portion; the edge portion of the other panel having longitudinally spaced but aligned ribs complementary to said channel and nested therein; said channel having projections therein complementary to and nested in the spaces between said ribs; said projections and ribs having aligned openings extending longitudinally therethrough and defining a continuous closed passageway along said joint; a locking pin slidable in each of said openings, each locking pin being of the same length as its corresponding opening whereby it may be completely contained therein; and means on one of said panels, at one end of said joint, for moving an adjacent pin longitudinally of said passageway in one direction to push all said pins from an end of their respective openings and partially into the next adjacent opening to thereby lock said panels together.

8. A structure as defined in claim 7 including further means on one of said panels at the other end of said joint for moving said pins in the other direction.

9. A structure as defined in claim 7 wherein said last-named means comprises a screw member threaded in an end portion of said passageway.

10. A structure as defined in claim 7 wherein said last-named means comprises an end pin slidable in said passageway and projecting outwardly from the end thereof.

11. A structure as defined in claim 7 wherein said panels are formed of reinforced resinous material and wherein each of said openings is defined by a metal tube imbedded in said material.

12. A structure as defined in claim 7 including a second pair of similar panels arranged with the defined joints of each pair positioned in axial alignment, the end pin in one joint abutting the adjacent end pin of the other joint, said pairs of panels having edge portions defining a further joint extending to and transversely of said defined joints.

13. A structure as defined in claim 7 including limiting means in each opening for limiting axial movement of the pin therein between the positions where the pin is entirely within the opening and where it projects partly from one end thereof.

14. A structure as defined in claim 13 wherein said limiting means comprises, one annular chamber around each pin between the ends of its associated opening, an annular groove around each pin, and a split ring in each groove engageable with the ends of its associated chamber.

15. A structure as defined in claim 7 wherein one of said panels is formed with another edge portion angularly related to but adjacent said first edge portion; said other edge portion being provided with a similar means, including locking pins; and means connecting the end pin of said one edge portion with the adjacent end pin of said other edge portion to cause the pins of both said edge portions to move simultaneously.

16. A structure as defined in claim 15 wherein the adjacent end openings in said one and another edge portions are defined by a single tubular member having a curved portion between said edge portions, and a flexible compression member joining the pins in said tubular member and extending through said curved portion.

17. A structure comprising, a first panel having a first channel along one edge thereof, one side of said channel having a notch extending substantially to the mid portion of the channel, a pair of adjacent wall panels having edge portions extending transversely of said channel at said notch, the edge portion of one adjacent panel defining a second channel formed at one end complementary to said notch and nested therein to define intersecting channels at said notch without voids therebetween; the panel having said second channel also having a rib projecting from an adjacent edge and nested in said first channel on one side of said notch, the other of said adjacent panels having a rib on its said edge portion nested in said second channel and a rib on its adjacent edge nested in said first channel on the other side of said notch, and means securing said panels in the described relationship.

18. A structure as defined in claim 17 wherein the edge surface of said notch, on the side thereof corresponding to said one adjacent panel, being parallel to and in abutment with the outer surface of said second channel.

References Cited in the file of this patent

UNITED STATES PATENTS

| 1,133,072 | Vanstrom | Mar. 23, 1915 |
| 1,358,203 | Herrmann et al. | Nov. 9, 1920 |
| 1,429,220 | Blanton | Sept. 19, 1922 |
| 2,432,396 | Earhart | Dec. 9, 1947 |
| 2,644,553 | Cushman | July 7, 1953 |
| 2,675,040 | Raun et al. | Apr. 13, 1954 |

FOREIGN PATENTS

| 148,598 | Great Britain | July 26, 1920 |